United States Patent
Williams

Patent Number: 5,247,902
Date of Patent: Sep. 28, 1993

[54] CAT CLIMBING APPARATUS

[76] Inventor: Jean Williams, 1200 N. Michigan Ave., Atlantic City, N.J. 08401

[21] Appl. No.: 877,848

[22] Filed: May 4, 1992

[51] Int. Cl.⁵ .............................................. A01K 29/00
[52] U.S. Cl. ..................................... 119/706; 482/35
[58] Field of Search ........................... 182/40, 42, 156; D25/62; 482/35, 36, 37; 119/29

[56] References Cited

U.S. PATENT DOCUMENTS

| | | | |
|---|---|---|---|
| 227,324 | 5/1880 | Tucker | 182/40 |
| D. 254,813 | 4/1980 | Kossar | 30/42 |
| D. 265,447 | 7/1982 | Harris | 6/131 |
| D. 269,821 | 7/1983 | Hurley | 30/42 |
| 3,159,141 | 12/1964 | Paterek | 119/29 |
| 3,756,593 | 9/1973 | Lehr | 482/35 |
| 4,943,046 | 7/1990 | Beltzig | 482/37 |
| 5,002,012 | 3/1991 | Pierrot | 119/28.5 |
| 5,038,716 | 8/1991 | Olson | 119/29 |

*Primary Examiner*—John G. Weiss
*Attorney, Agent, or Firm*—Thomas A. Lennox

[57] ABSTRACT

A climbing apparatus for domestic cats to be hung in a doorway, in a window or other location including a flexible sheet of film material extending close to the floor hung on hooks wherein the sheet has a multiplicity of openings spaced over a major portion of the flexible sheet with edge sections unperforated to discourage the cat from leaving the apparatus at a height above the floor.

15 Claims, 2 Drawing Sheets

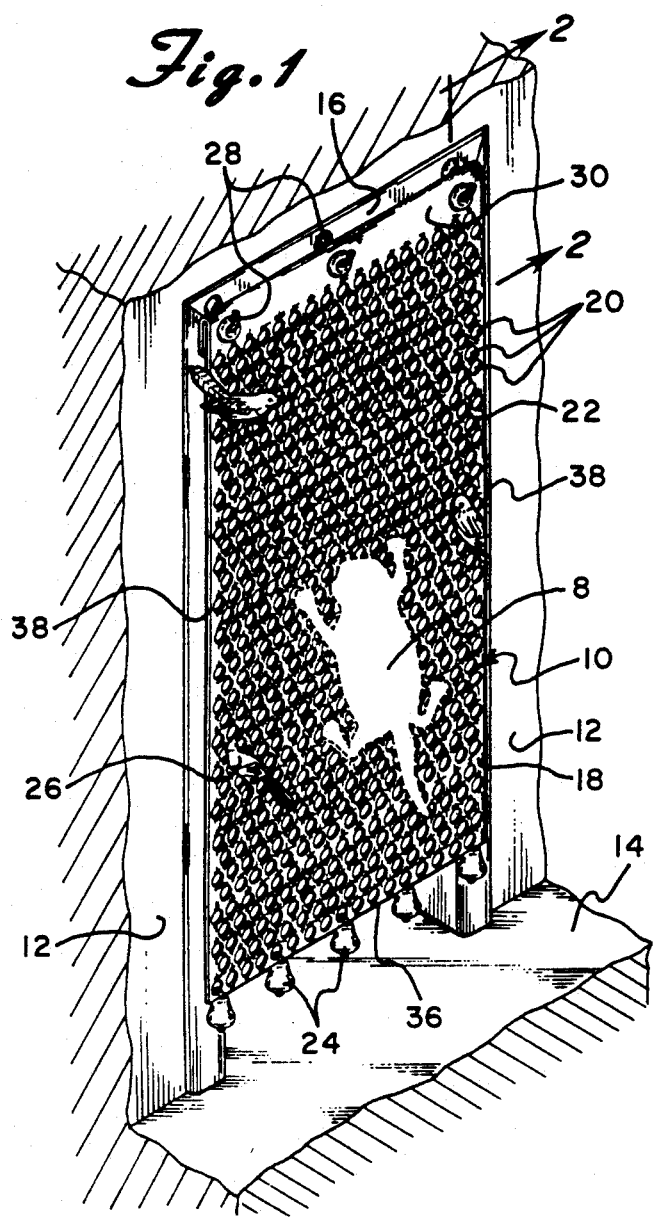
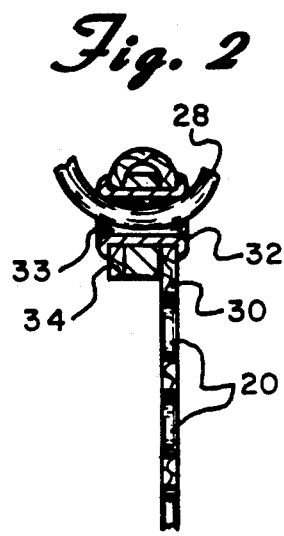
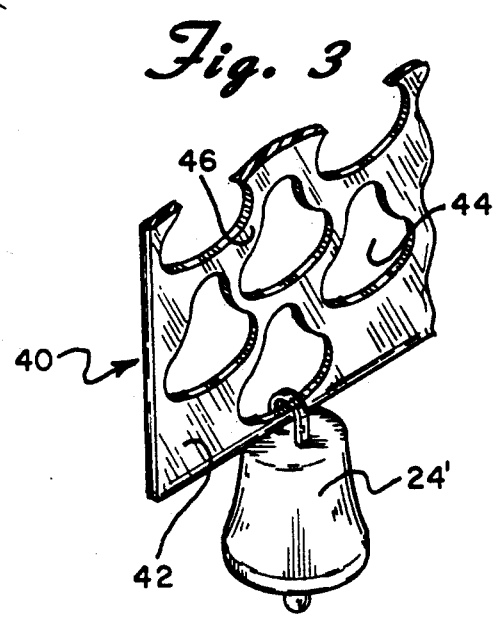

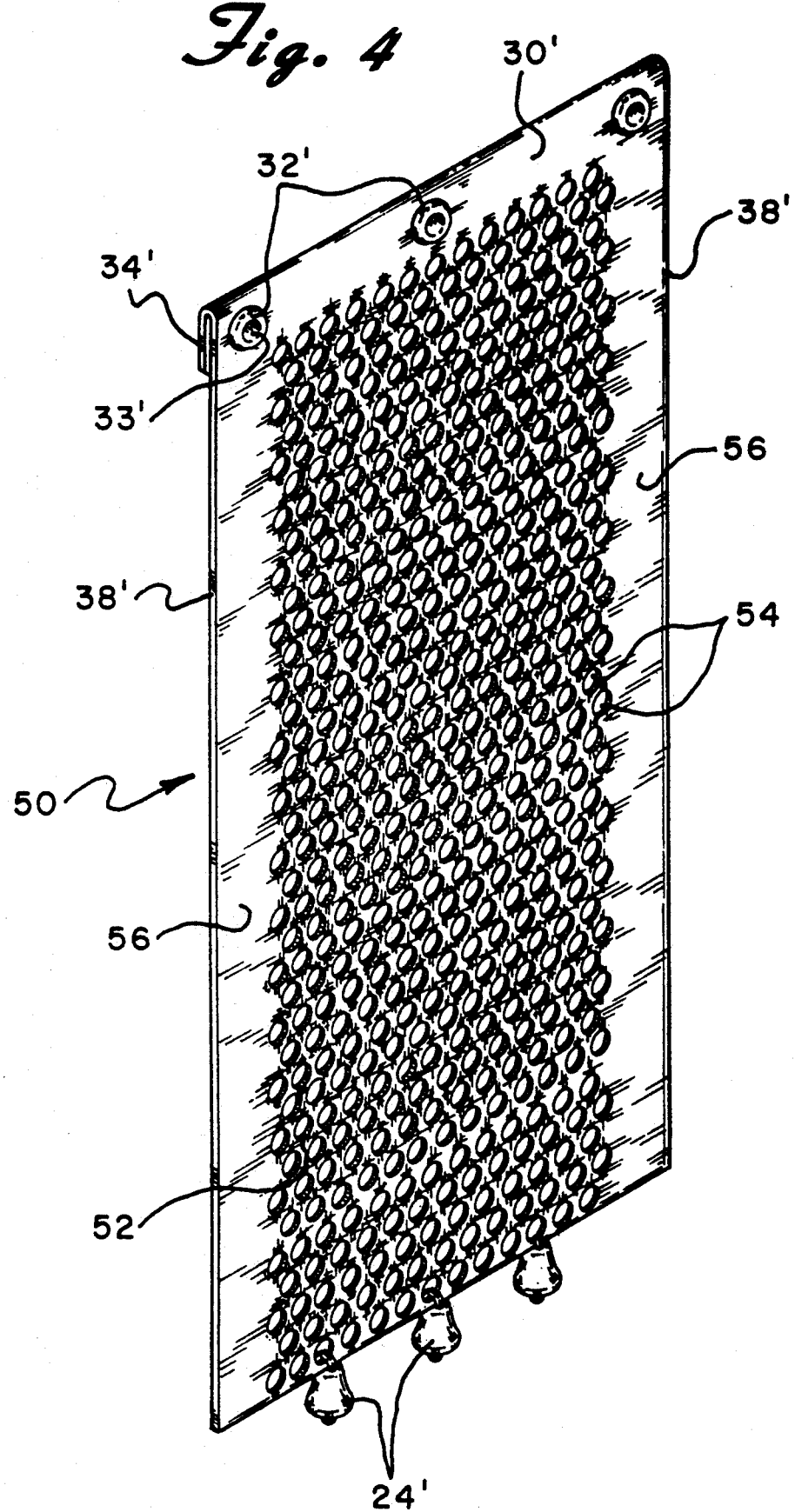

CAT CLIMBING APPARATUS

BACKGROUND OF THE INVENTION

This invention involves a climbing apparatus for cats. More particularly, this invention involves an apparatus to allow house cats to satisfy their natural climbing instincts without damaging the house interior.

The cat species, even including the domestic house cat have, in general, a natural instinct to climb. For a house cat, particularly one that remains indoors at all times, this usually means climbing the furniture and draperies in the residence. A number of apparatuses to aid cats in climbing have been provided, particularly wooden structures covered with floor carpeting. These devices commonly allow the cat to climb to a height that it can see out a window, which is apparently a common desire for the house cat. While these devices sometimes save furniture from damage caused by the cat's claws as well as the polished surface of wood furniture, such as tables, many cats are not satisfied unless they can climb to the upper reaches of the room. This usually means that they climb on the draperies, usually leaving them damaged or even in shreds.

None of the prior art devices provide an easily installed and easily dismantled device that allows cats to climb to the upper reaches of the room with no significant damage to the decor.

SUMMARY OF THE INVENTION

It is an object of the present invention to provide an apparatus which may be readily attached to a doorway, over a cabinet or chest of drawers, or even over a drapery or a window, which will allow a house cat to satisfy its climbing instincts with little damage to the interior of the residence.

It is a specific object of the present invention to provide a device that can be easily hooked onto an interior structure and when not in use, unhooked and rolled up and stored in a small space.

It is an additional object of the present invention to provide a climbing device on which can easily be hung playthings that appeal to a cat such as small animals, catnip, bells and the like. The playthings provide added incentives for the cat to climb on the device.

It is a particular object of the present invention to provide a drapeable panel which includes openings that allow the cat to readily and safely climb the apparatus with essentially no danger of being caught or entangled in the device.

An aspect of the invention is an apparatus for domestic cats to climb includes a flexible sheet of material, preferably about five to about one hundred fifty mils thick, that has a length of about three to about eight feet from end to end. The apparatus includes a multiplicity of openings through the flexible sheet spaced over a major portion of the flexible sheet each opening having a span of about three quarters to about three inches across. The distance across the flexible sheet across webs of the flexible sheet between adjacent openings is no more than about the span of the openings. Finally, the apparatus includes hanging means proximate one end to allow releasable hanging of the flexible sheet lengthwise.

It is preferred that the hanging means include a plurality of reinforced holes spaced across one end of the flexible sheet and hooks attachable to an interior surface in a residence sized to interfit into the holes. It is also preferred that the flexible sheet be constructed of fabric reinforced plasticized polyvinyl chloride film. It is also preferred that the sheet be transparent or at least translucent. It is more preferred that the thickness of the sheet be in the range of about three to about fifty mils, and most preferred that the thickness be in the range of about five to about twenty-five mils. It is further preferred that shapes of the openings be rounded, and more preferred that the openings be circular. It is also preferred that the span of the openings be about one to about two inches. It is further preferred that the distance across the web between openings be about one-tenth to about one-half of the span of the openings. It is further preferred that the openings be spaced over proximately the entire flexible sheet. It is most preferred that the openings be spaced over the majority of the surface of the flexible sheet while leaving strips of unperforated sheet along both lengthwise edges. The width of these strips are preferred to be sufficient to inhibit a climbing cat from leaving the device.

Another aspect of the invention is a method to provide means for domestic cats to climb inside residences without contacting the interior of the residence. The method includes providing an apparatus that includes a flexible sheet of material about five to about one hundred fifty mils thick comprising a length of about three to about eight feet from end to end, and a multiplicity of openings through the flexible sheet spaced over a major portion of the flexible sheet each opening having a span of about three quarters to about three inches across. The distance across the flexible sheet between adjacent openings is no more than the span of the openings. The method further includes releasably hanging one end of the flexible sheet to an interior surface of the residence to allow the flexible sheet to hang lengthwise with an opposite end proximate a floor in the residence.

BRIEF DESCRIPTION OF THE DRAWINGS

FIG. 1 is a perspective view of a device of the present invention hung in a doorway.

FIG. 2 is a partial vertical cross-sectional view taken through the device illustrated in FIG. 1, taken from the top of the device downwardly a portion of the length.

FIG. 3 is a cut away portion of a second embodiment of the invention.

FIG. 4 is a perspective view of a third embodiment of the invention.

DESCRIPTION OF PREFERRED EMBODIMENTS

In FIG. 1, device 10 is hung in door frame 12 with bottom edge 36 close to floor surface 14 on which cat 8 climbs. Climbing device 10 is constructed of film sheet 18 which is constructed of ten mil thick plasticized polyvinyl chloride film reinforced with woven fabric. The material is preferred drapeable and preferably of a thickness in the range of about two mils to about one hundred fifty mils. More preferred are sheets three mils to about fifty mils and most preferred are sheets in the range of five to twenty-five mils. As the thickness of the sheet is reduced below five mils, increased tear susceptibility caused by the cat's claws are found. At the lower thicknesses, it is more important to utilize cloth reinforced sheet material or leather. As the thickness increases above twenty-five mils, it is preferred to use more flexible and drapeable materials including foamed thermoplastic films. It is possible to utilize webs of sheets of material from which other useful objects have been stamped, cut, or otherwise removed from the web. While these webs might otherwise be discarded or recycled, they may now be used in a device of the present invention. The sheet may be transparent or translucent film and may be constructed of polyolefins including polyethylene and polypropylene, polyesters, as well as plasticized polyvinyl chloride. Further, the flexible sheet may be constructed of natural materials including leather, rubber and synthetic substitutes. Holes 20 are spaced essentially over the entire surface of film sheet 18. In this embodiment, the holes are circular about one inch in diameter separated by a web 22 of film sheet 18 with the distance between the holes about one-half inch. It is preferred that the span between the hole openings be about one-tenth to about one-half of the span of the openings. While it is preferred that the openings be rounded to reduce the tendency to initiate tears or cracks, the openings may be in any suitable shape of sufficient size to receive the cats claws as it climbs the device. Top end section 30 of film sheet 18 is hung and supported on hooks 28 attached into top door frame 16. A variety of targets and playthings may be hung from device 10. In this embodiment, birds 26 are hung at various heights with bells 24 hung on bottom edge 36 which will not only indicate when the cat is climbing but also serve as playthings if the cat is on the floor. As illustrated in FIG. 2, plastic grommets 32 to reinforce holes 33 sized to receive hooks 28 are spaced along top end section 30 where the film sheet is folded over itself in folded section 34 to provide added strength and reinforcement along the upper edge. In this embodiment, the holes extend horizontally essentially all the way to lengthwise edges 38. In FIG. 3, a partial cutaway perspective view of device 40 is illustrated utilizing transparent polyvinyl butyral sheet 42 through which rounded "bell" shaped holes 44 are cut. In this embodiment, the maximum span of openings 44 is about one and one-half inches with the minimum web 46 width being about one-quarter inch. In FIG. 4, device 50 is similar to that of device 10 constructed of polyvinyl chloride sheet 52 with one inch circular openings 54 spaced over a major portion of the surface of sheet 52 leaving six inch non-perforated edge panels 56 extending along lengthwise edges 38'. Like elements to that of device 10 are designated with a prime or double prime. In this embodiment, strips 56 tend to keep the climbing cat on the device, rather than leaving the device to climb on adjacent furniture or drapes. This is particularly desirable when the device is hung over draperies or next to curtains.

While this invention has been described with reference to the specific embodiments disclosed herein, it is not confined to the details set forth and the patent is intended to include modifications and changes which may come within and extend from the following claims.

I claim:

1. An apparatus for domestic oats to climb comprising:
   (a) a flexible sheet of material comprising a thickness in the range of about five to about twenty-five mils thick and a length of about three to about eight feet from end to end of lengthwise edges,
   (b) a multiplicity of circular openings through the flexible sheet spaced over the flexible sheet each opening having a span of about one to about two inches across,
      wherein distance across the flexible sheet between adjacent openings is no more than the span of the openings, wherein the the openings are spaced over a major portion of the flexible sheet while leaving strips of unperforated sheet along both lengthwise edges, wherein the strips have a width in the range of about one quarter foot to about one foot, and
   (c) hanging means proximate one end to allow releasable hanging of the flexible sheet lengthwise.

2. The apparatus of claim 1 wherein the hanging means comprises a plurality of reinforced holes spaced across one end of the flexible sheet and hooks attachable to an interior surface in a residence sized to interfit into the holes.

3. The apparatus of claim 1 wherein the flexible sheet is constructed of fabric reinforced plasticized polyvinyl chloride film.

4. The apparatus of claim 1 wherein shapes of the openings are rounded.

5. The apparatus of claim 4 wherein shapes of the openings are circular.

6. The apparatus of claim 1 wherein the span of the openings is about one to about two inches.

7. The apparatus of claim 5 wherein the span of the openings is about one to about two inches.

8. The apparatus of claim 5 wherein the openings are spaced over proximately the entire flexible sheet except for the area of the unperforated strips.

9. The apparatus of claim 1 wherein the flexible sheet has a thickness in the range of about two to about one hundred and fifty mils thick.

10. The apparatus of claim 9 wherein the flexible sheet has a thickness in the range of about three to about fifty mils thick.

11. The apparatus of claim 9 wherein the flexible sheet has a thickness in the range of about five to about twenty-five mils thick.

12. The apparatus of claim 1 wherein the widths of the unperforated strips of sheet along both lengthwise edges are in the range of about one quarter foot to about one foot.

13. The apparatus of claim 12 wherein the widths of the unperforated strips of sheet along both lengthwise edges are about six inches.

14. The apparatus of claim 1 wherein the widths of the unperforated strips of sheet along both lengthwise edges are about six inches.

15. A method to provide means for domestic cats to climb inside residences without contacting the interior of the residence:
   (a) providing an apparatus comprising:
      (i) a flexible sheet of material about five to about fifty mils thick comprising a length of about three to about eight feet from end to end, and
      (ii) a multiplicity of openings through the flexible sheet spaced over a major portion of the flexible sheet each opening having a span of about three quarters to about three inches across,
         wherein distance across the flexible sheet between adjacent openings is no more than the span of the openings, and
         wherein the the openings are spaced over a major portion of the flexible sheet while leaving strips of unperforated sheet along both lengthwise edges, wherein the strips have a width in the range of about one quarter foot to about one foot, and
   (b) releasably hanging one end of the flexible sheet to an interior surface of the residence to allow the flexible sheet to hang lengthwise with an opposite end proximate a floor in the residence.

* * * * *